(12) United States Patent
Wu et al.

(10) Patent No.: US 11,356,129 B2
(45) Date of Patent: Jun. 7, 2022

(54) QUASI-REFLECTIONLESS MICROSTRIP BANDPASS FILTERS WITH IMPROVED PASSBAND FLATNESS AND OUT-OF-BAND REJECTION

(71) Applicant: The Regents of the University of California, Oakland, CA (US)

(72) Inventors: Xiaohu Wu, Davis, CA (US); Xiaoguang Liu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/237,355

(22) Filed: Apr. 22, 2021

(65) Prior Publication Data

US 2021/0344365 A1   Nov. 4, 2021

Related U.S. Application Data

(60) Provisional application No. 63/018,232, filed on Apr. 30, 2020.

(51) Int. Cl.
*H04B 1/00* (2006.01)
*H04B 1/40* (2015.01)
*H04B 1/30* (2006.01)

(52) U.S. Cl.
CPC ........... *H04B 1/0057* (2013.01); *H04B 1/001* (2013.01); *H04B 1/30* (2013.01); *H04B 1/40* (2013.01); *H04B 2001/307* (2013.01)

(58) Field of Classification Search
CPC ........ H04B 1/0057; H04B 1/001; H04B 1/30; H04B 1/40; H04B 2001/307; H01P 1/302; H03H 7/0161
See application file for complete search history.

(56) References Cited

U.S. PATENT DOCUMENTS

2006/0273869 A1* 12/2006 Jachowski ............ H01P 1/2039
333/204
2007/0262834 A1* 11/2007 Albacete ............. H01P 1/20381
333/204
2014/0035703 A1*  2/2014 Ma ...................... H01P 1/20336
333/204

* cited by examiner

*Primary Examiner* — Nguyen T Vo
(74) *Attorney, Agent, or Firm* — Park, Vaughan, Fleming & Dowler LLP

(57) ABSTRACT

The disclosed embodiments provide an absorptive coupled-line bandpass filter. This bandpass filter includes a first port, which is coupled to a first absorptive stub, and a second port, which is coupled to a second absorptive stub. The bandpass filter also includes a coupled-line bandpass section coupled between the first and second ports, wherein the coupled-line bandpass section comprises a set of one or more parallel strip line resonators, which are coupled together in series and are coupled to the first and second ports through overlapping coupled-line sections, wherein at a center frequency of a passband for the absorptive coupled-line bandpass filter, the first and second absorptive stubs appear as open circuits, and outside of the passband, the first and second absorptive stubs appear as matched loads to ground and contribute to absorption of out-of-band signals.

23 Claims, 17 Drawing Sheets

US 11,356,129 B2

QUASI-REFLECTIONLESS MICROSTRIP BANDPASS FILTERS WITH IMPROVED PASSBAND FLATNESS AND OUT-OF-BAND REJECTION

CROSS-REFERENCE TO RELATED APPLICATION

This application claims the benefit of U.S. Provisional Patent Application Ser. No. 63/018,232, entitled "Absorptive Microstrip Bandpass Filters with Improved Passband Flatness and Out-of-Band Rejection," by inventors Xiaoguang Liu and Xiaohu Wu, filed on 30 Apr. 2020, the contents of which are incorporated by reference herein.

BACKGROUND

Field

The disclosed embodiments generally relate to the design of bandpass filters that function as building blocks in radio frequency (RF) and microwave systems. More specifically, the disclosed embodiments relate to the design of a quasi-reflectionless microstrip bandpass filter that provides improved passband flatness and out-of-band rejection.

Related Art

As fundamental building blocks in radio frequency (RF) and microwave systems, filters are used to better define the system bandwidth or reject undesired signals. In a conventional filter, rejection is achieved by presenting significantly mismatched impedance to the undesired (out-of-band) signals. In some systems, such reflection will deteriorate the performance of adjacent non-linear devices, such as analog-to-digital converters, mixers, and high-gain amplifiers. A common solution to this problem is to insert non-reciprocal devices, such as isolators or circulators, to re-direct the reflected signal to an absorptive load. However, this approach comes at a cost because the magnetic non-reciprocal devices are known to be bulky, expensive, bandwidth limited, and are difficult to integrate with the rest of the active electronics.

Recently, there has been an increasing interest in reflectionless (absorptive) filters which effectively mitigate the reflection signals. In contrast to the conventional reflective-type filters, the non-transmitted stopband signals in a reflectionless filter are dissipated within the filter itself. In other words, reflectionless filters provide good impedance matching not only in the passband but also in the stopband.

A number of reflectionless bandpass filter designs have been proposed. However, these proposed designs have a number of drawbacks, including: providing limited bandwidth; having a large circuit size; causing high insertion loss; and exhibiting absorptive behavior in only a limited frequency range. As a consequence, reflectionless bandpass filters, particularly those that are well-matched at both the input and output ports, still remain a challenge to design.

Hence, what is needed is a reflectionless bandpass filter design that does not suffer from the drawbacks of existing reflectionless bandpass filter designs.

SUMMARY

The disclosed embodiments provide a new design for an absorptive coupled-line bandpass filter. This bandpass filter includes a first port, which is coupled to a first absorptive stub, and a second port, which is coupled to a second absorptive stub. The bandpass filter also includes a coupled-line bandpass section coupled between the first and second ports, wherein the coupled-line bandpass section comprises a set of one or more parallel strip line resonators, which are coupled together in series and are coupled to the first and second ports through overlapping coupled-line sections.

In some embodiments, at a center frequency of a passband for the absorptive coupled-line bandpass filter, the first and second absorptive stubs appear as open circuits, and outside of the passband, the first and second absorptive stubs appear as matched loads to ground and contribute to absorption of out-of-band signals.

In some embodiments, the coupled-line bandpass section includes one strip line resonator so that the bandpass filter forms a 1-pole quasi-reflectionles s filter.

In some embodiments, the coupled-line bandpass section includes two parallel strip line resonators so that the bandpass filter forms a 2-pole quasi-reflectionles s filter.

In some embodiments, the coupled-line bandpass section includes three parallel strip line resonators so that the bandpass filter forms a 3-pole quasi-reflectionles s filter.

In some embodiments, the coupled-line bandpass section includes N parallel strip line resonators so that the bandpass filter forms an N-pole quasi-reflectionles s filter.

In some embodiments, the first and second absorptive stubs each comprise a stub input, a resistor R and a quarter-wavelength resonator $Z_s$, wherein R and $Z_s$ are coupled in series between the stub input and ground.

In some embodiments, the first and second absorptive stubs each comprise a stub input, three quarter-wavelength resonators $Z_a$, $Z_b$ and $Z_c$ and a resistor R, wherein $Z_c$, R and $Z_a$ are coupled in series between the stub input and ground, and wherein $Z_b$ is coupled to the connection between $Z_c$ and R.

In some embodiments, the passband filter further includes a cross-coupling connection between the first and second absorptive stubs to facilitate phase cancellation of signals at frequencies outside of the passband.

In some embodiments, the cross-coupling connection connects together the last quarter-wavelength resonators $Z_c$ of the first and second absorptive stubs.

In some embodiments, the cross-coupling connection comprises one or more cascaded coupled line sections, which are shorted to ground.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Discussion

Several reflectionless bandstop filter designs have been developed based on: lossy resonators, a bridge-T structure, and a complementary diplexer architecture. Essentially, directional filter topologies are used to implement reflectionless bandpass filters. The penalty paid, however, includes limited bandwidth, large circuit size, and high insertion loss. An asymmetrical quasi-reflectionless bandpass filter with tunable passband has also been developed by using lossy resonators close to one of its termination ports. Hence, reflectionless bandpass filters, particularly those that are well-matched at both the input and output ports, still remain a challenge to design.

Figure 1B:
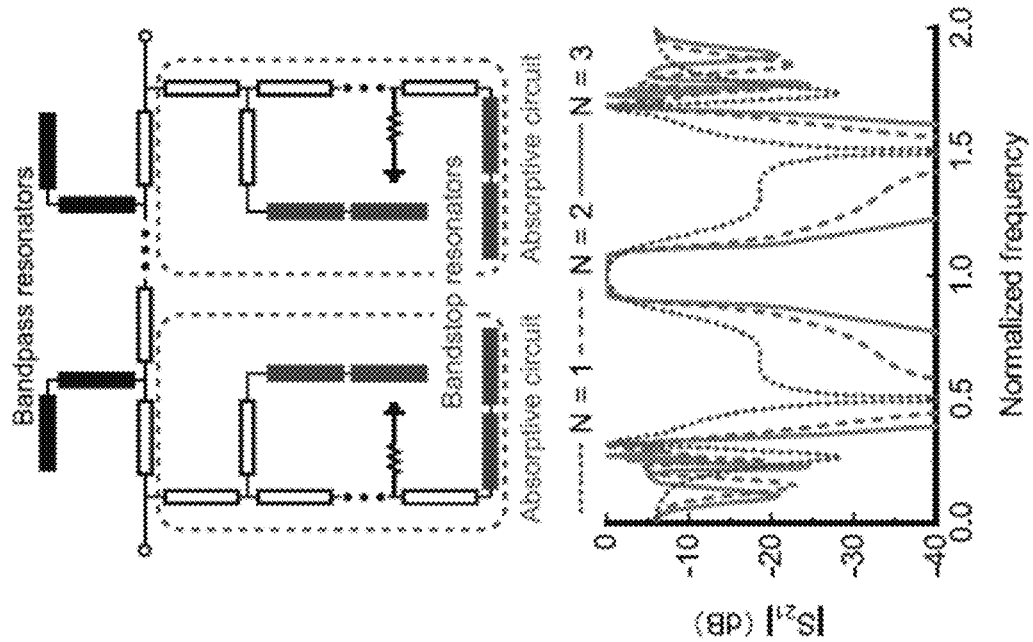
FIG. 1B illustrates a microstrip quasi-reflectionless bandpass filter with a complementary diplex architecture, wherein auxiliary absorptive circuits are loaded at both the input and output ports.
Figure 1A:
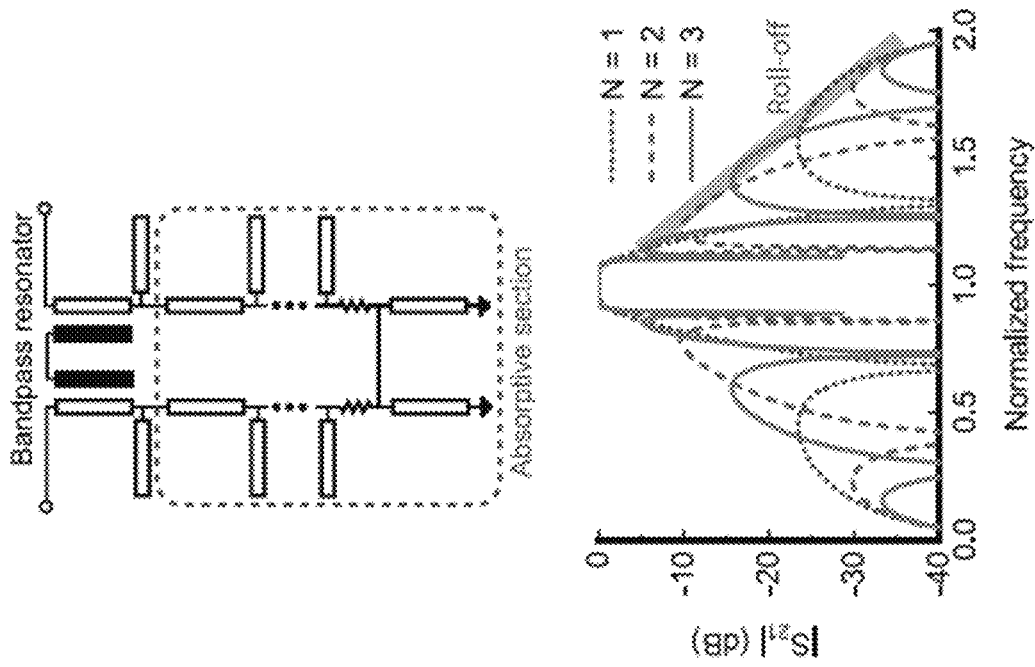
FIG. 1A illustrates a microstrip reflectionless bandpass filter with a single bandpass resonator in the main channel.

Based on the even-odd-duality theory, lumped-element reflectionless prototypes having low-pass, high-pass, bandpass, or bandstop characteristics have been developed with theoretically all-band fully reflectionless characteristics at both the input and output ports. Based on the reflectionless low-pass prototypes, distributed first-order and higher-order reflectionless filters have been derived. In these designs, however, only the order of the absorptive section circuit is increased whereas a single bandpass resonator is used in the main channel. Despite sharper passband roll-off at the transmission zero frequencies, the far-out roll-off of the filter remains the same, as is illustrated in FIG. 1A. Lumped implementations of symmetrical lumped reflectionless filters with arbitrary prescribed transmission responses have also been developed.

To achieve symmetrical two-port reflectionless properties using the complementary diplexer architecture, auxiliary absorptive circuits need to be loaded at both the input and output ports. The associated theoretical analysis demonstrates symmetrical quasi-reflectionless properties and provides general guidance in terms of implementations using acoustic, lumped-element, transmission-line, etc. However, the resulting overall circuit size is considerably larger than that of its associated bandpass filter circuit. Also, the demonstrated microstrip filters show absorptive behavior only in a limited frequency range, and they degenerate back to reflective-type responses at the stopband center frequency, as is illustrated in FIG. 1B.

Figure 2A:
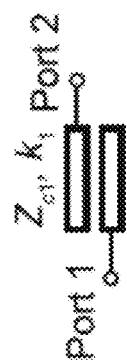
FIG. 2A illustrates an absorptive coupled-line.
Figure 2B:
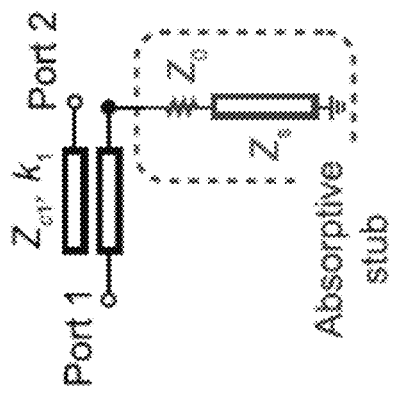
FIG. 2B illustrates an absorptive coupled-line with a loaded absorptive stub.

A conventional reflection-type coupled line is shown in FIG. 2A, and an absorptive coupled line loading with a one-pole absorptive stub is shown in FIG. 2B. To enhance the all-band matching and the in-band transmission flatness, the one-pole stub of FIG. 2B is modified to form the proposed two-pole absorptive stub shown in FIG. 2C.

Figure 1C:
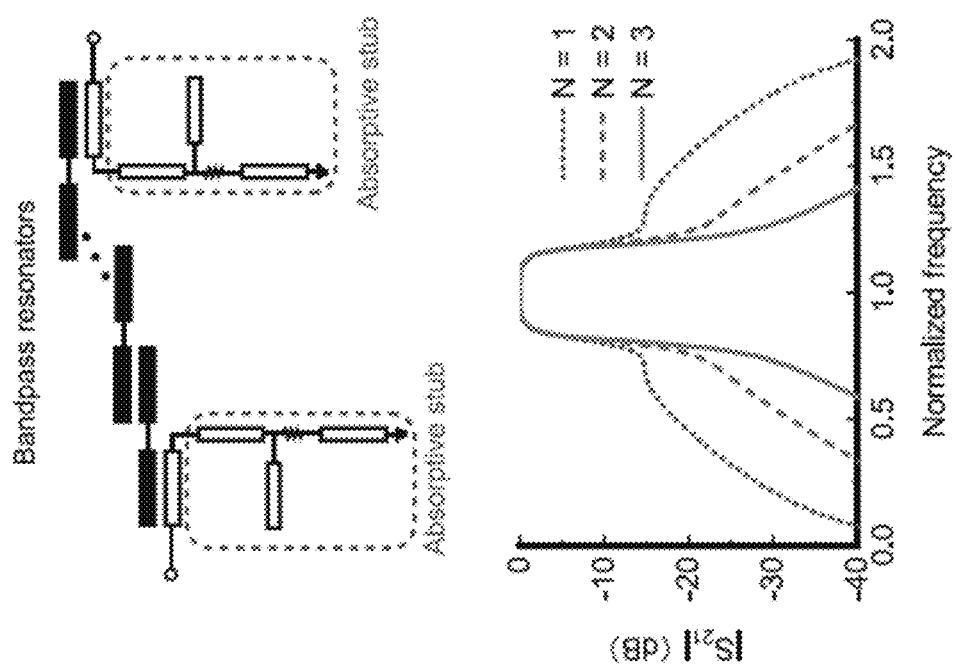
FIG. 1C illustrates a microstrip quasi-reflectionless bandpass filter in accordance with the disclosed embodiments.
Figure 2C:
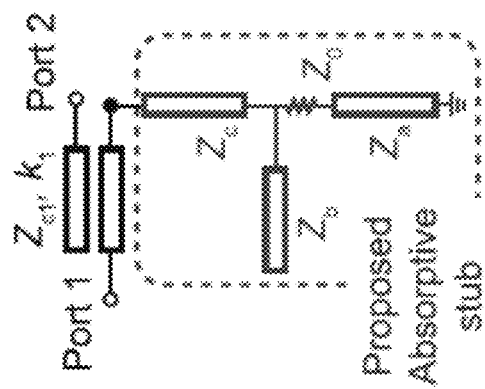
FIG. 2C illustrates a proposed absorptive stub section in accordance with the disclosed embodiments.

In this specification, high-order quasi-reflectionless filters with improved passband flatness and out-of-band rejection (as shown in FIG. 1C), are presented using the proposed absorptive stub section illustrated in FIG. 2C. Analysis shows that this structure absorbs not only the stopband reflection, but also the close-to-passband signals, thus improving the passband roll-off and close-in rejection. The higher-order nature of the absorptive circuit significantly improves the passband transmission flatness, particularly at the edge of the passband. In addition, a higher-order reflectionless passband can be easily realized by increasing the order of the bandpass sections without changing the matching performance. To further improve the out-of-band rejection, cross-coupling can be introduced between the absorptive stubs. The proposed designs advance the state-of-the-art by demonstrating high-order distributed quasi-reflectionless filters with a flat passband, enhanced out-of-band rejection, and good impedance matching both in-band and out-of-band.

Absorptive Coupled-Lines

We now provide a detailed analysis of a proposed absorptive coupled-line, which includes a conventional coupled-line section and an absorptive stub loaded at one of the open ends of the coupled-line.

The Proposed Absorptive Stub

Figure 3A:
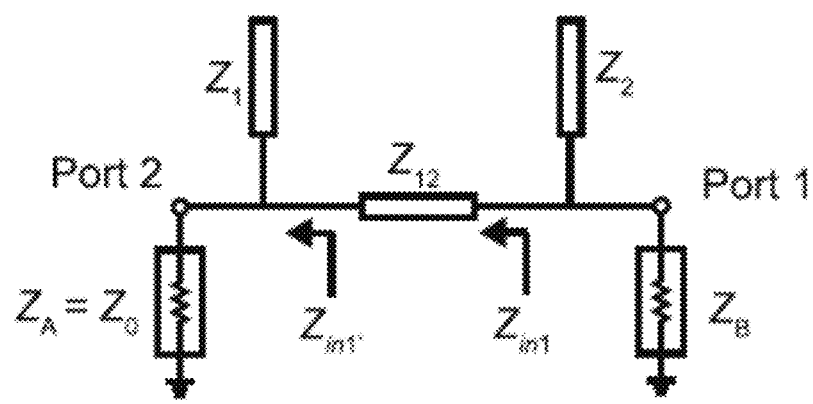
FIG. 3A illustrates a transmission line circuit of a conventional 2-pole bandstop filter.

To help understand the working principle of the absorptive stub, we liken it to a simple 2-pole bandstop filter. FIG. 3 shows the evolution process. A 2-pole transmission-line bandstop filter is shown in FIG. 3A, where $Z_1$ and $Z_2$ are the characteristic impedances of the shunt open stubs, and $Z_{12}$ is the characteristic impedance of the transmission line connecting the two stubs. All the transmission line segments have the same electrical length $\theta=90°$ at the stopband center frequency $f_0$. $Z_A$ and $Z_B$ are the port impedances.

The impedance parameters of the bandstop filter circuit can be extracted from its low-pass filter prototype as follows, $$Z_B = Z_A g_0 g_3, \quad (1a)$$

$$Z_1 = Z_A\left(1 + \frac{1}{\gamma g_0 g_1}\right), \quad (1b)$$

$$Z_2 = \frac{Z_A g_0}{\gamma g_2}, \quad (1c)$$

$$Z_{12} = Z_A(1 + \gamma g_0 g_1), \quad (1d)$$

where $\gamma$ is given by, $$\gamma = 2\pi f_1' \cot\left(\frac{\pi}{2}\frac{f_1}{f_0}\right). \quad (2)$$

Here, $f_1'$ is the cutoff frequency of the low-pass prototype filter ($f_1'=1$ Hz), wherein $g_i$ (i=0, 1, 2 and 3) are the element values of the prototype low-pass filters, $f_0$ is the stopband center frequency, and $f_1$ is the cutoff frequency of the stopband filter.

In the following analysis, $Z_A$ is set to 50Ω and the stopband center frequency $f_0$ is normalized to 1.0 GHz.

$$Z_{in1} = Z_{12}\frac{Z'_{in1} + jZ_{12}\tan\theta}{Z_{12} + jZ'_{in1}\tan\theta}, \quad (3)$$

where $$Z'_{in1} = \frac{Z_A Z_1}{Z_1 + jZ_A\tan\theta}. \quad (4)$$

The real part and imaginary part of Zin1 can be derived as $$\text{Re}\{Z_{in1}\} = \frac{Z_A Z_{12}^2 Z_1^2(1 + \tan^2\theta)}{Z_{12}^2 Z_1^2 + Z_A^2(Z_{12} + Z_1)^2 \tan^2\theta}, \quad (5a)$$

$$\text{Im}\{Z_{in1}\} = \frac{Z_{12}^2 Z_1^2 - Z_A^2(Z_1 - Z_{12}\tan^2\theta)(Z_{12} + Z_1)}{Z_{12}^2 Z_1^2 + Z_A^2(Z_{12} + Z_1)^2 \tan^2\theta \times Z_{12}\tan\theta}. \quad (5b)$$

As defined in (1), $Z_1$ and $Z_{12}$ have the following relationship with respect to the termination impedance $Z_A$ $$Z_A = \frac{Z_{12}Z_1}{Z_{12} + Z_1}. \quad (6)$$

Applying (6) to (5), we have $$\text{Re}[Z_{in1}]=Z_A, \quad (7a)$$

$$\text{Im}[Z_{in1}]=(Z_{12}-Z_A)\tan\theta, \quad (7b)$$

Figure 3B:
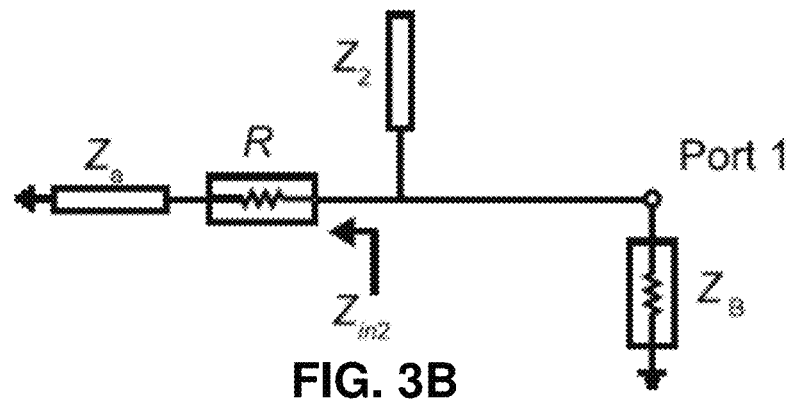
FIG. 3B illustrates a simplified circuit that exhibits similar responses as a conventional 2-pole bandstop filter.

On the other hand, the input impedance $Z_{in2}$ of the circuit in FIG. 3B is $$Z_{in2}=R+jZ_a\tan\theta, \quad (8)$$

By setting $$R=Z_A, \quad (9a)$$

$$Z_a=Z_{12}-Z_A, \quad (9b)$$

$Z_{in2}$ can be made equal to $Z_{in1}$, implying that the circuit in FIG. 3B is equivalent to the one in FIG. 3A in terms of input impedance, but with a much more compact size due to the reduced transmission line length.

Figure 3C:
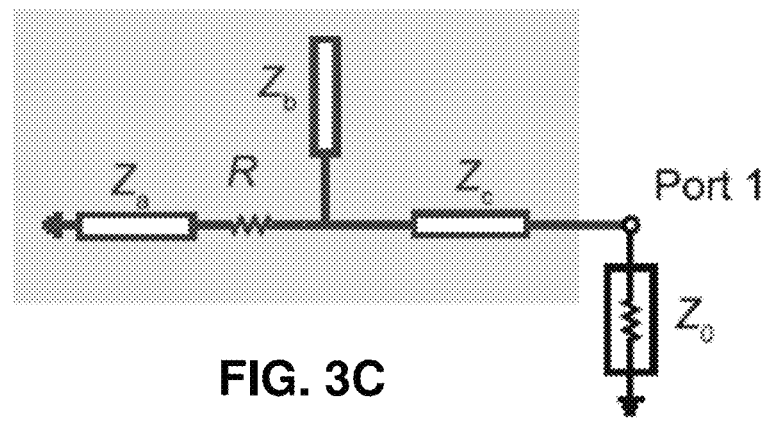
FIG. 3C illustrates a proposed absorptive stub in accordance with the disclosed embodiments.

By inserting a quarter-wavelength transformer with impedance $Z_c$ into FIG. 3B, the proposed absorptive stub circuit can be obtained, as shown in FIG. 3C. The required $Z_c$ is given by $$Z_c=\sqrt{Z_B Z_0}, \quad (10)$$

and $$Z_b=Z_2. \quad (11)$$

For a lossless two-port network, such as the one in FIG. 3A, conservation of power requires $$|S_{11}|^2+|S_{21}|^2=1, \quad (12)$$

For the absorptive single-port circuit in FIG. 3C, the power is either reflected at Port 1 or absorbed by the resistor R. Defining $S_{11,AS}$ and $S_{a,AS}$ as the reflection and absorption coefficients of the absorptive stub, we have $$|S_{11,AS}|^2+|S_{a,AS}|^2=1, \quad (13)$$

Comparing (13) and (12), it is clear that $S_{a,AS}$ behaves just like the transmission coefficient $S_{21}$ in the sense that signal power is transmitted to the resistor R to be absorbed.

Figure 4:
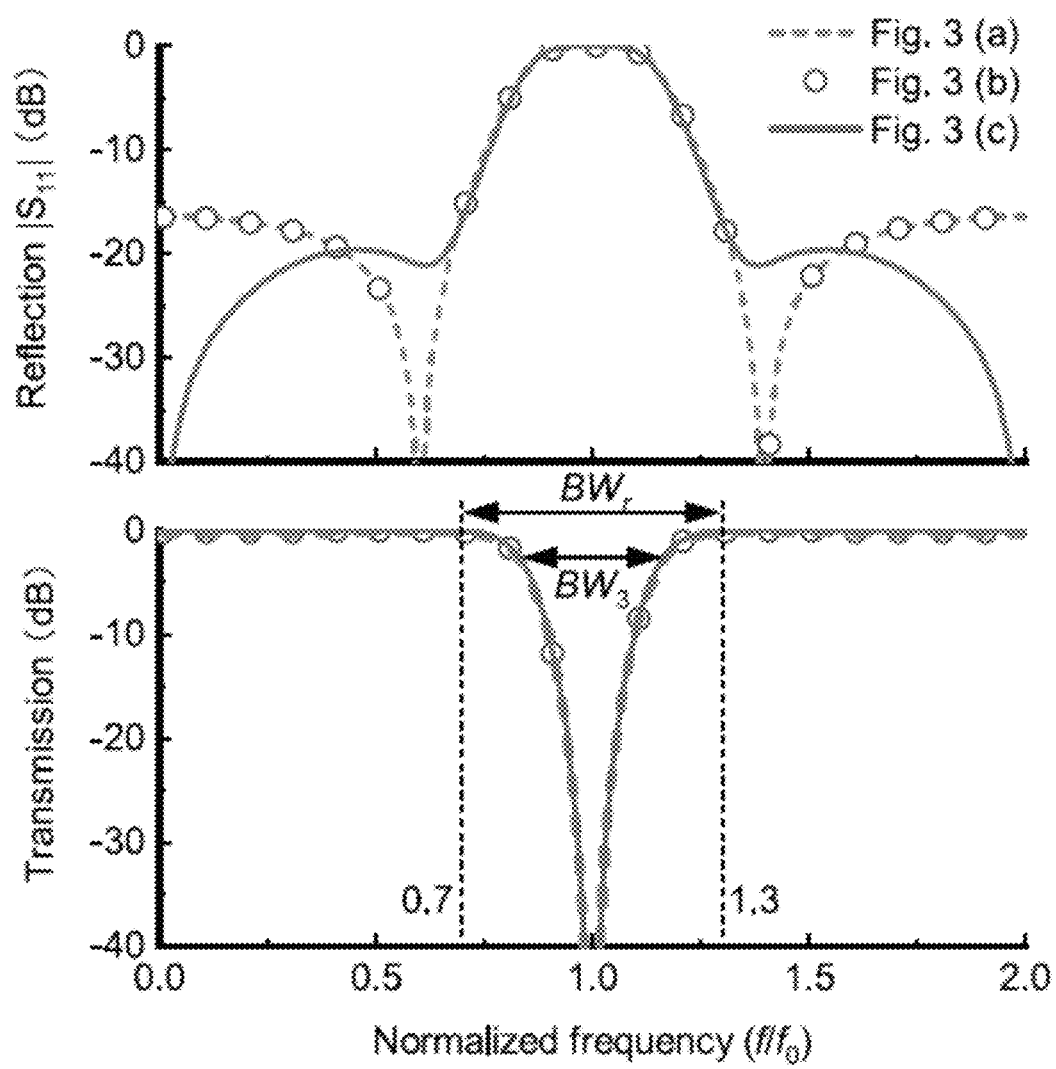
FIG. 4 presents graphs illustrating responses of the three derived circuits illustrated in FIGS. 3A-3C in accordance with the disclosed embodiments.

With this definition in mind, we compare the reflection and transmission characteristics of the three circuits of FIG. 3 in FIG. 4. Here, a bandstop filter at 1.0 GHz with 0.1-dB passband ripple and 60% stopband bandwidth is used as an example. The low-pass prototype element values are found to be $g_0=1.0$, $g_1=0.8431$, $g_2=0.6220$, $g_3=1.3554$. According to (1), (2), and (9), the circuit parameters are $Z_A=50\Omega$, $Z_B=67.8\Omega$, $Z_1=166.4\Omega$, $Z_b=Z_2=157.8\Omega$, $Z_{12}=71.5\Omega$, $Z_a=21.5\Omega$, $Z_c=58.2\Omega$, and $R=50\Omega$.

A few observations can be made from FIG. 4.

(1) Circuit FIG. 3B is equivalent to circuit FIG. 3A in terms of both the reflection and transmission (absorption) coefficients.

(2) It is clear from FIG. 4 that the three circuits have similar transmission (absorption) coefficient in both the passband and stopband. The transmission coefficients of the three circuits merge together because the discrepancies due to reflection differences can be neglected. Here, $BW_r$ and $BW_{3\,dB}$ correspond to the ripple bandwidth and 3-dB bandwidth, respectively. In this specific example, $BW_3=0.54BW_r$.

(3) Due to the dispersion of the quarter-wavelength transformer, the circuit in FIG. 3C is equivalent to the circuit in FIG. 3A and the circuit in FIG. 3B only in the vicinity of the center frequency. For example, the three circuits have the same $BW_r$ (60%) and $BW_{3\,dB}$ (32%). An interesting and unique property of circuit FIG. 3C is that it is well-matched at the even harmonics, e.g., 0 GHz and 2.0 GHz, in contrast to the circuits of FIG. 3A and FIG. 3B. As will be seen, this property helps the stopband attenuation and enables wideband absorption characteristics.

Absorptive Coupled-Lines

Figure 5:
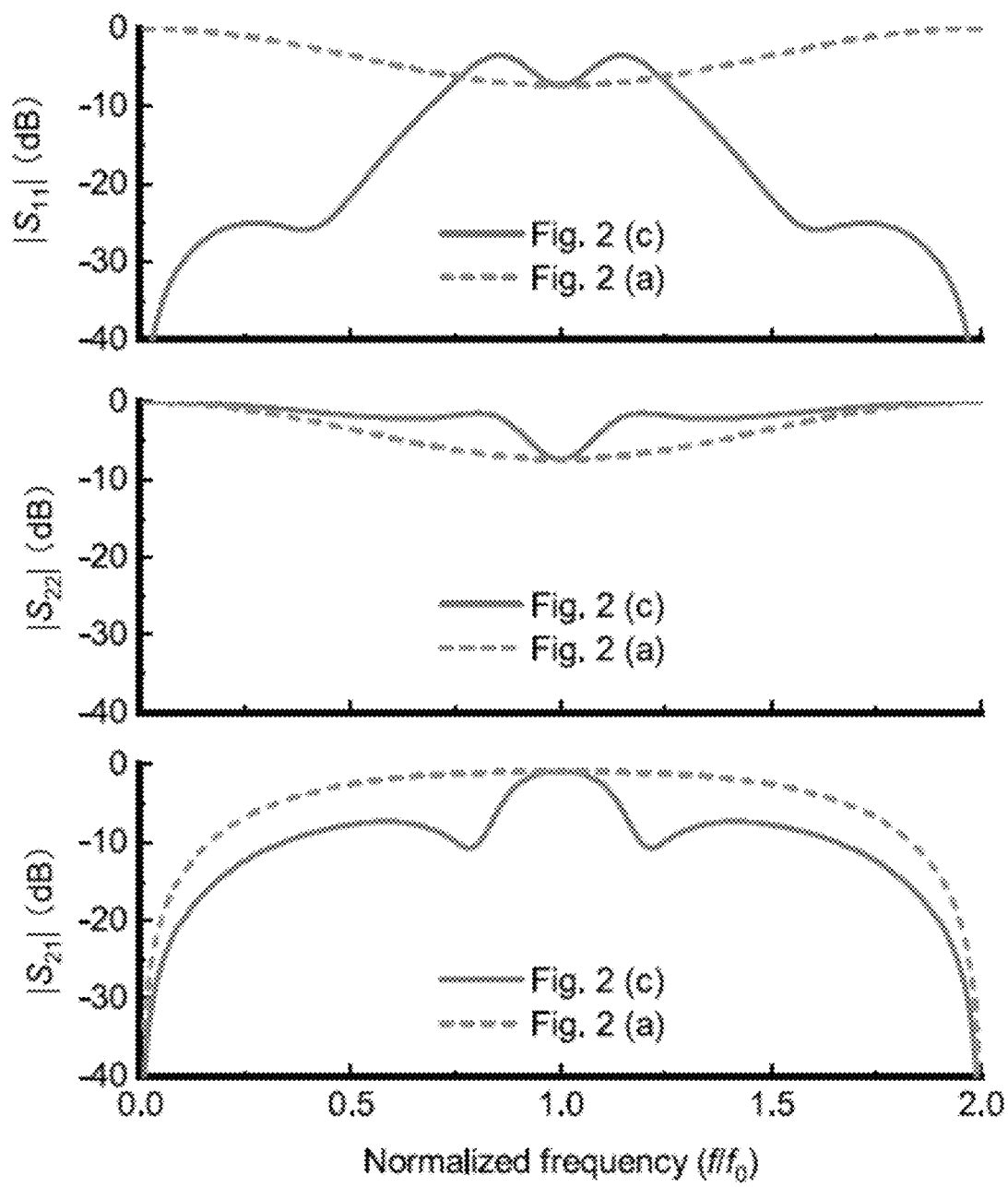
FIG. 5 presents graphs illustrating a comparison of simulated frequency responses of the quasi-reflectionless circuit and its coupled-line bypass section in accordance with the disclosed embodiments.

Absorptive coupled-lines can be realized by loading the proposed absorptive stub to the open end of a conventional coupled-line section, as shown in FIG. 2C. FIG. 5 compares the frequency responses between the absorptive coupled-line and a conventional coupled-line section at a nominal center frequency of 1.0 GHz.

Since the absorptive stub is only loaded to the open end of Port 1, the two-port absorptive coupled-line of FIG. 2C shows asymmetrical matching characteristics, i.e., Port 1 is all-band reflectionless while Port 2 is only matched at the center frequency. At the center frequency, the conventional coupled-line and the absorptive coupled-line exhibit the same transmission and reflection responses. As we move away from the center frequency, the absorptive coupled-line exhibits much better impedance matching than the conventional coupled-lines at Port 1. For example, at 0 and 2.0 GHz, the conventional coupled-line is fully reflective whereas the absorptive coupled-line is strongly absorptive at the input port, with both $|S_{11}|$ and $|S_{22}|$ below −40 dB. In addition, the absorptive stub absorbs not only the out-of-band reflections but also the close-to-passband signals, leading to enhanced passband selectivity.

Quasi-Reflectionless Bandpass Filter Design

1-Pole Quasi-Reflectionless Filter Example

Figure 6:
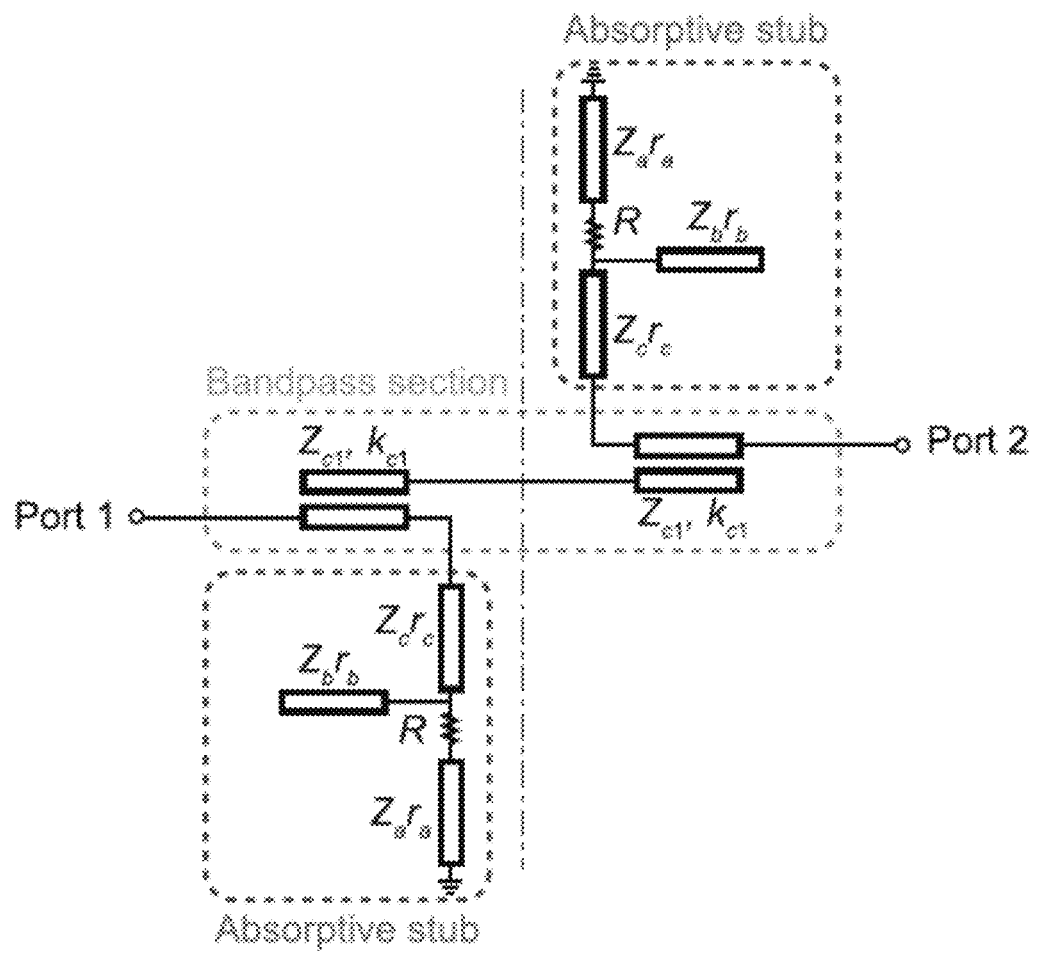
FIG. 6 illustrates a transmission line circuit model of a 1-pole quasi-reflectionless bandpass filter in accordance with the disclosed embodiments.

By connecting two absorptive coupled-lines as is illustrated in FIG. 2C, one can realize a "1-pole" bandpass filter with symmetrical dual-port reflectionless performance. FIG. 6 shows the transmission-line circuit model of such a circuit. Here, $Z_{c1}$ and $k_{c1}$ are the coupled characteristic impedance and coefficient, respectively. The coupled-line even-mode and odd-mode impedance $Z_{ec1}$ and $Z_{oc1}$ are given by $Z_{c1}\sqrt{k_{c1}}$ and $Z_{c1}/\sqrt{k_{c1}}$, respectively. To optimize the transmission and absorption performance, the impedance of the lines is slightly adjusted by three scaling parameters $r_a$, $r_b$, and $r_c$, as shown in FIG. 6.

Figure 7:
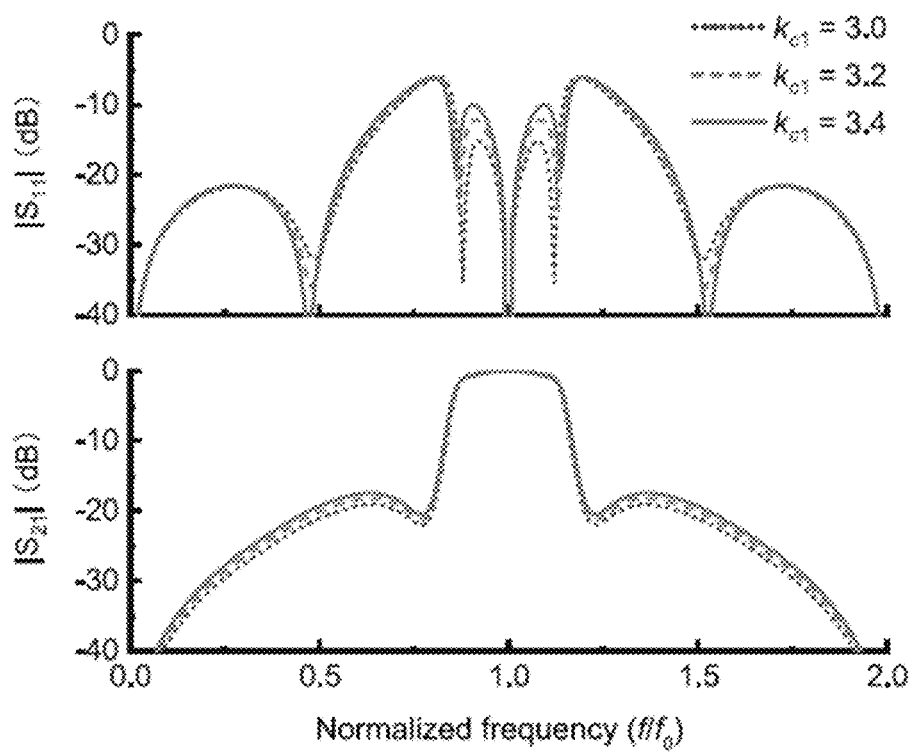
FIG. 7 illustrates simulated frequency responses for a 1-pole reflectionless bandpass filter with respect to $k_{c1}$ in accordance with the disclosed embodiments.
Figure 8:
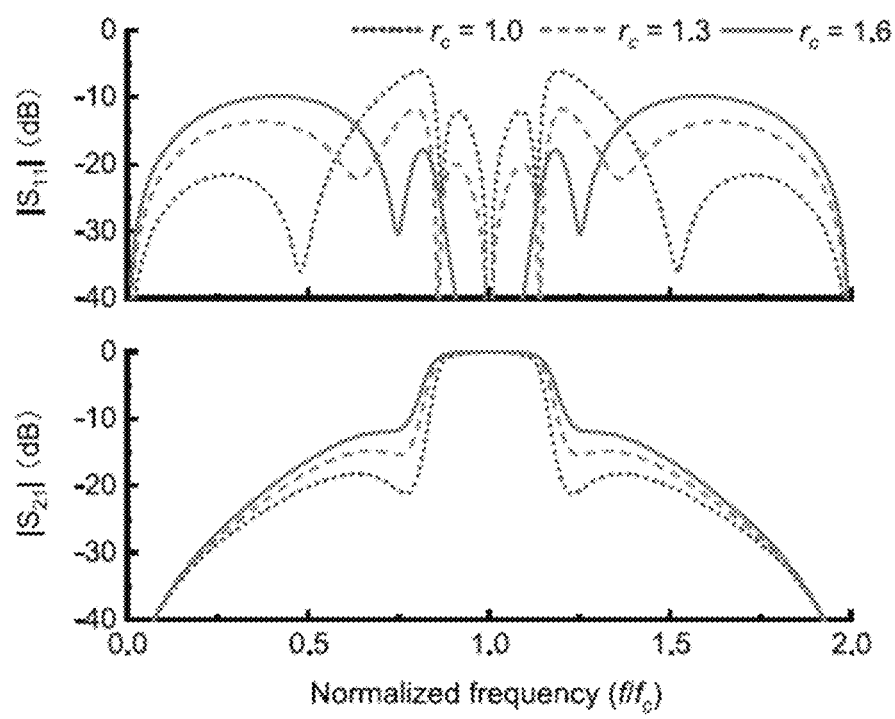
FIG. 8 illustrates simulated frequency responses for a 1-pole reflectionless bandpass filter with respect to $r_c$ in accordance with the disclosed embodiments.
Figure 9:
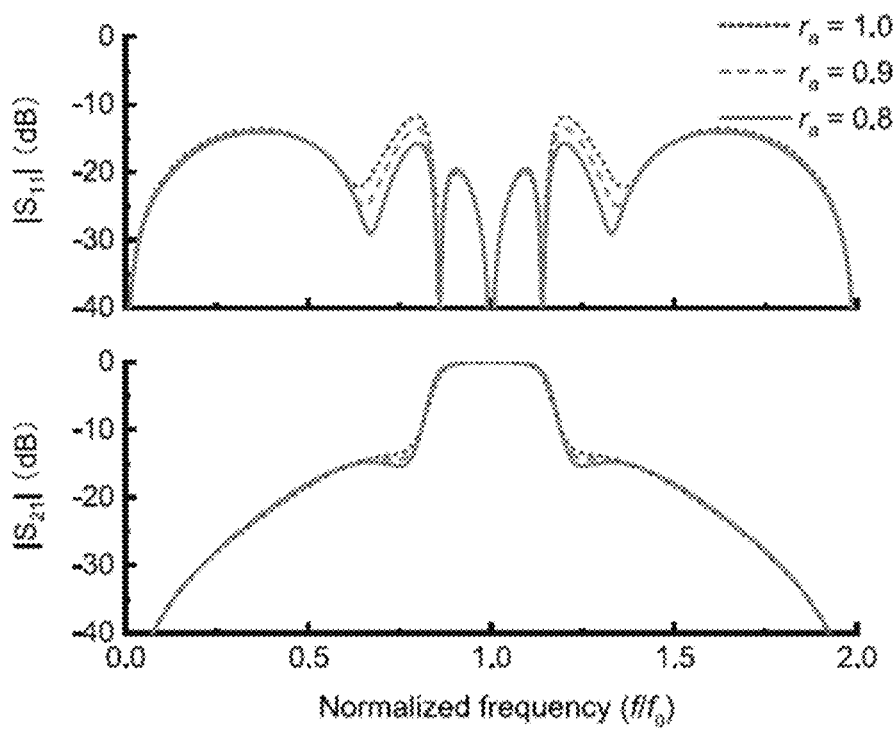
FIG. 9 illustrates simulated frequency responses for a 1-pole reflectionless bandpass filter with respect to $r_a$ in accordance with the disclosed embodiments.
Figure 10:
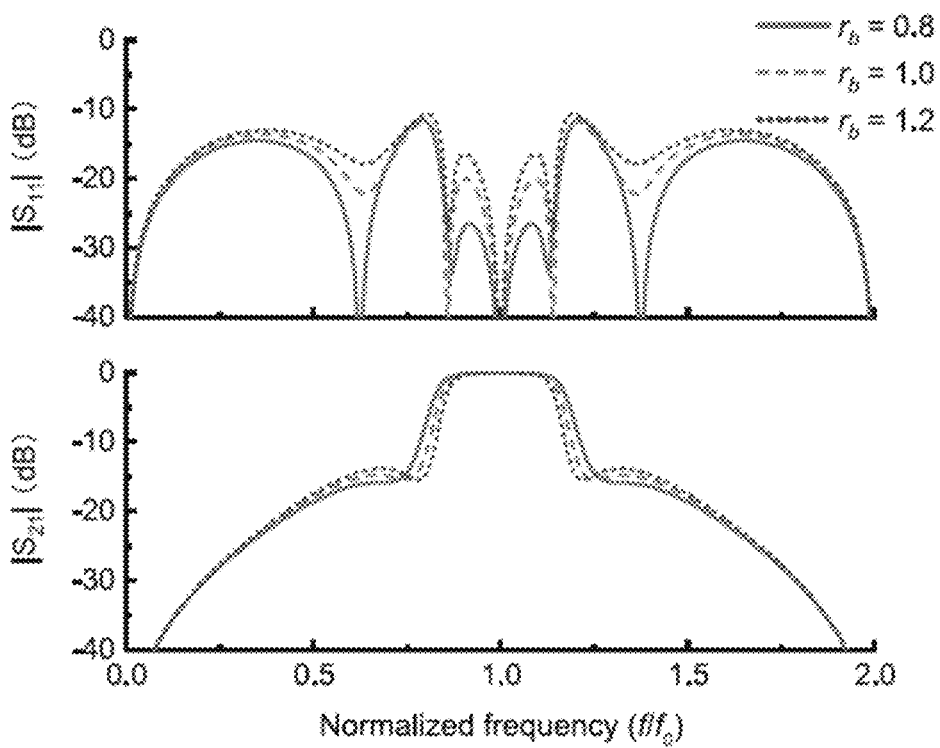
FIG. 10 illustrates simulated frequency responses for a 1-pole reflectionless bandpass filter with respect to $r_b$ in accordance with the disclosed embodiments.

The transmission and reflection characteristics of the quasi-reflectionless filter are studied parametrically in FIGS. 7-10. The nominal values of the various parameters follow the same example given in the "Proposed Absorptive Stub" section above. In particular, FIG. 7 illustrates the simulated frequency responses of the 1-pole quasi-reflectionless bandpass filter with respect to $k_{c1}$, wherein $Z_{c1}=50\Omega$, $Z_a=21.5\Omega$, $Z_b=157.8\Omega$, $Z_c=58.2\Omega$, $R=50\Omega$, $r_a=1.0$, $r_b=1.0$ and $r_c=1.0$. FIG. 8 illustrates the simulated frequency responses of the 1-pole quasi-reflectionless bandpass filter with respect to $r_c$, wherein $Z_{c1}=50\Omega$, $k_{c1}=3.2$, $Z_a=21.5\Omega$, $Z_b=157.8\Omega$, $Z_c=58.2\Omega$, $R=50\Omega$, $r_a=1.0$, and $r_b=1.0$. FIG. 9 illustrates the simulated frequency responses of the 1-pole quasi-reflectionless bandpass filter with respect to $r_a$, wherein $Z_{c1}=50\Omega$, $k_{c1}=3:2$, $Z_a=21.5\Omega$, $Z_b=157.8\Omega$, $Z_c=58.2\Omega$, $R=50\Omega$, $r_b=1.0$, and $r_c=1.3$). FIG. 10 illustrates the simulated frequency responses of the 1-pole quasi-reflectionless bandpass filter with respect to $r_b$, wherein $Z_{c1}=50\Omega$, $k_{c1}=3:2$, $Z_a=21:5\Omega$, $Z_c=157.8\Omega$, $Z_c=58.2\Omega$, $R=50\Omega$, $r_a=1.0$, and $r_c=1.3$).

The bandwidth of the quasi-reflectionless filter is mainly determined by the bandwidth of the absorptive stub circuit because the coupled-lines section usually provides a much larger bandwidth. This is evident from FIG. 7 in which we can see that the frequency response of the filter is not strongly dependent on the coupling coefficient of the coupled-lines section.

Admittedly, the reflection at the passband-stopband transition region, e.g., around 0.8 GHz and 1.2 GHz, is high. The $r_a$, $r_b$, and $r_c$ are used to improve the absorption performance.

As shown in FIG. 8, the overall reflection changes significantly with respect to $r_c$. A larger $r_c$ benefits lower reflection not only in the passband but also in the transition band, although at the cost of the deteriorated stopband matching. A slight increase in $BW_{3\,dB}$ with increased $r_c$ can also be observed. For a well-balanced overall reflection performance, an optimal value of $r_c=1.3$ is chosen, resulting in the passband reflection below −20 dB, the transition band reflection below −12 dB, and the stopband reflection below −14 dB.

FIG. 9 shows that the frequency responses of the quasi-reflectionless bandpass filter are nearly the same as $r_a$ increases, except for an improvement in the reflection at the passband-stopband transition region. In contrast, the overall reflection remains almost the same but an obvious improvement in the passband reflection, as well as a decrease in $BW_{3\ dB}$, can be observed as $r_b$ increases (see FIG. 10).

Figure 11:
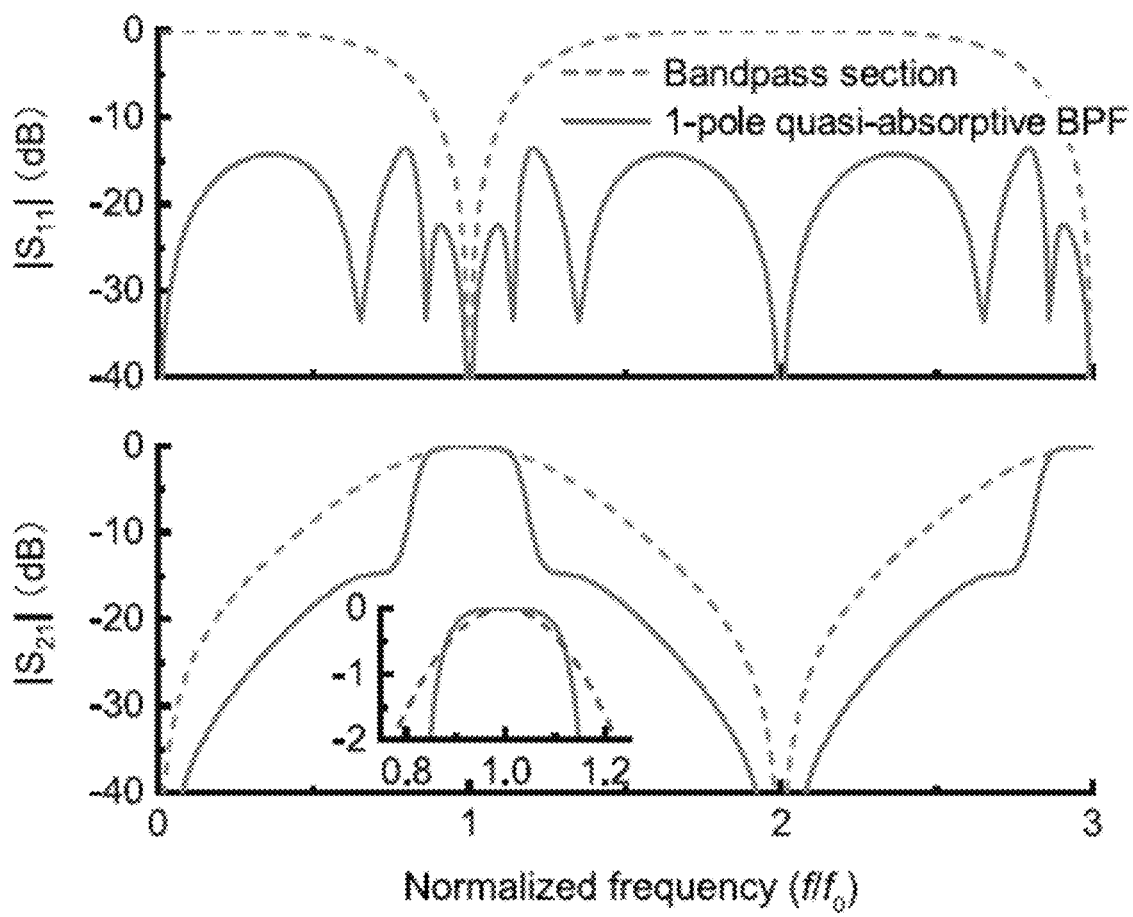
FIG. 11 illustrates simulated frequency responses for a 1-pole reflectionless bandpass filter and its bandpass section in accordance with the disclosed embodiments.

Following the above analysis, the transmission and reflection responses of the optimized 1-pole quasi-reflectionless bandpass filter are given in FIG. 11. In this figure, the responses of its bandpass section are also included for comparison. Obviously, the bandpass section exhibits a conventional 1-pole bandpass response with its passband centered at 1.0 GHz and stopband located at 2.0 GHz. It is well-matched at the passband center frequency with one reflection zero and is fully reflective in the stopband.

The quasi-reflectionless filter has a spectral period of [0, $2f_0$) due to the periodic nature of the transmission line sections. The reflection of the 1-pole quasi-reflectionless filter is below −14 dB across all the frequency range. Owing to the absorptive stub's higher-order response, the filter exhibits a "flat" passband with reduced insertion loss variations. In addition, the absorptive stub also helps to eliminate out-of-band signals near the passband and significantly improves the close-in rejection. In this example, the close-in roll-off approaches that of a quasi-elliptic filter, although the far out-of-band roll-off is still that of a 1-pole filter, i.e., −20 dB/dec.

A Discussion on the Filter Bandwidth

Figure 12:
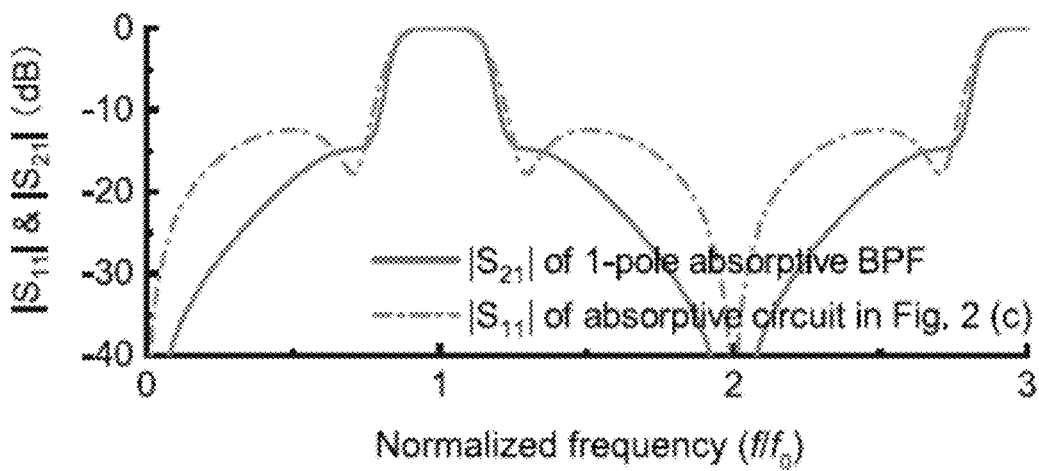
FIG. 12 illustrates a comparison between the transmission of a quasi-reflectionless bandpass filter and the reflection of the proposed absorptive stub in accordance with the disclosed embodiments.

FIG. 12 compares the transmission coefficient of a 1-pole quasi-reflectionless filter $|S_{21,ABF}|$ and the reflection coefficient of its absorptive stub $|S_{11,AS}|$. Here, the subscripts ABF and AS represent absorptive bandpass filter and absorptive stub, respectively. From FIG. 12, we can see that $|S_{21,ABF}|$ is almost the same as $|S_{11,AS}|$ in the vicinity of the passband. A qualitative explanation can be offered as follows.

In a resistor-embedded circuit such as the quasi-reflectionless filter of FIG. 6, the input signal power is either reflected, transmitted, or absorbed. Conservation of power requires $$|S_{11,ABF}|^2+|S_{21,ABF}|^2+|S_{a,ABF}|^2=1, \quad (14)$$

where $S_{a,ABF}$ is the absorption coefficient of the filter. Since $|S_{11}|\approx 0$ for the quasi-reflectionless filter, (14) reduces to $$|S_{21,ABF}|^2+|S_{a,ABF}|^2\approx 1. \quad (15)$$

Comparing (14) and (15) leads to the conclusion $$|S_{21,ABF}|\approx|S_{11,AS}|. \quad (16)$$

That is, the transmission response of the quasi-reflectionless filter is close to the reflection response of its absorptive stub. Note that this relationship is approximate because (14) and (15) are derived under slightly different impedance conditions.

As a consequence, the quasi-reflectionless filter's passband $BW_{3\ dB}$ is almost identical to the 3-dB reflection bandwidth of its absorptive stub. This observation serves as a starting point in the filter design procedure in terms of synthesizing the absorptive stub circuit from a prescribed bandwidth specification.

Extension to Higher-Order Designs

Figure 13A:
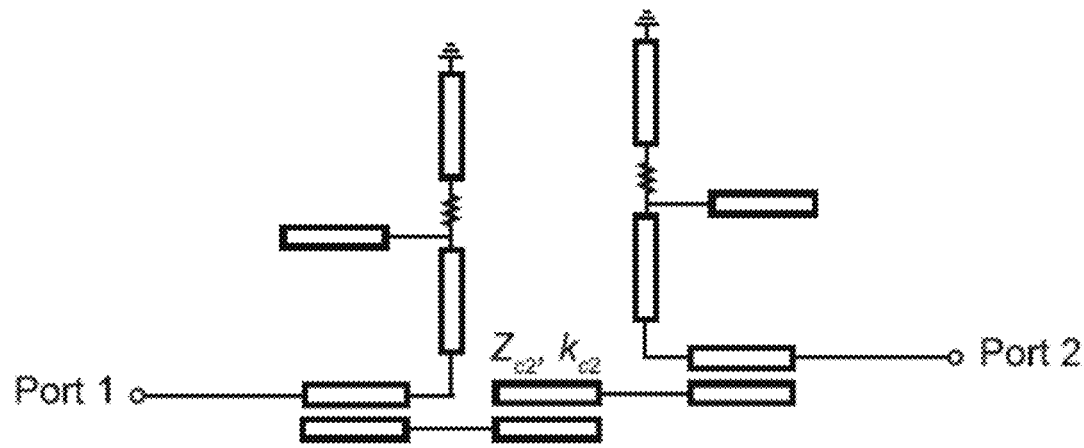
FIG. 13A illustrates a transmission line circuit model for a 2-pole quasi-reflectionless bandpass filter in accordance with the disclosed embodiments.
Figure 13B:
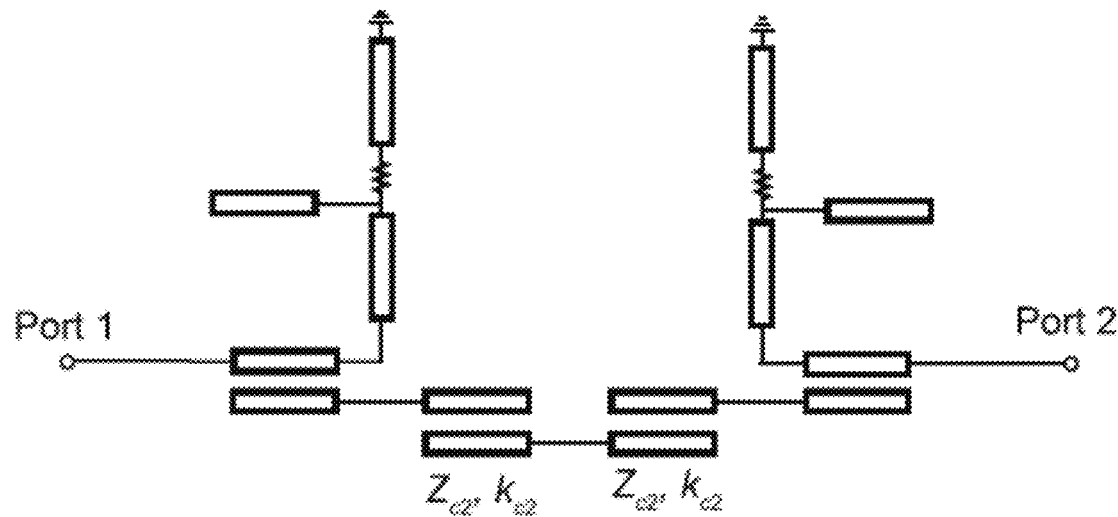
FIG. 13B illustrates a transmission line circuit model for a 3-pole quasi-reflectionless bandpass filter in accordance with the disclosed embodiments.

Building upon the 1-pole quasi-reflectionless filter of FIG. 6, higher-order quasi-reflectionless filters can be readily realized by cascading more bandpass coupled-line sections. FIGS. 13A and 13B show examples of a 2-pole and a 3-pole quasi-reflectionless filter, respectively. $Z_{c2}$ and $k_{c2}$ are the coupled-lines impedance and the coupling coefficient, respectively. Note that the added coupled-line sections have the same parameters as the filter order increases.

Figure 14A:
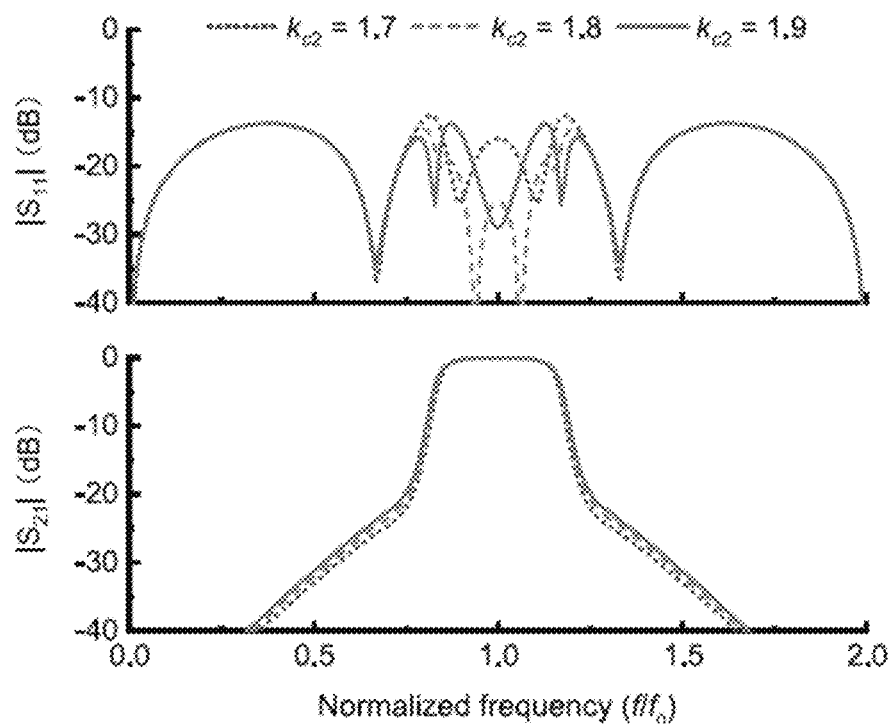
FIG. 14A illustrates a simulated frequency response for a 2-pole quasi-reflectionless bandpass filter with response to $k_{c2}$ in accordance with the disclosed embodiments.
Figure 14B:
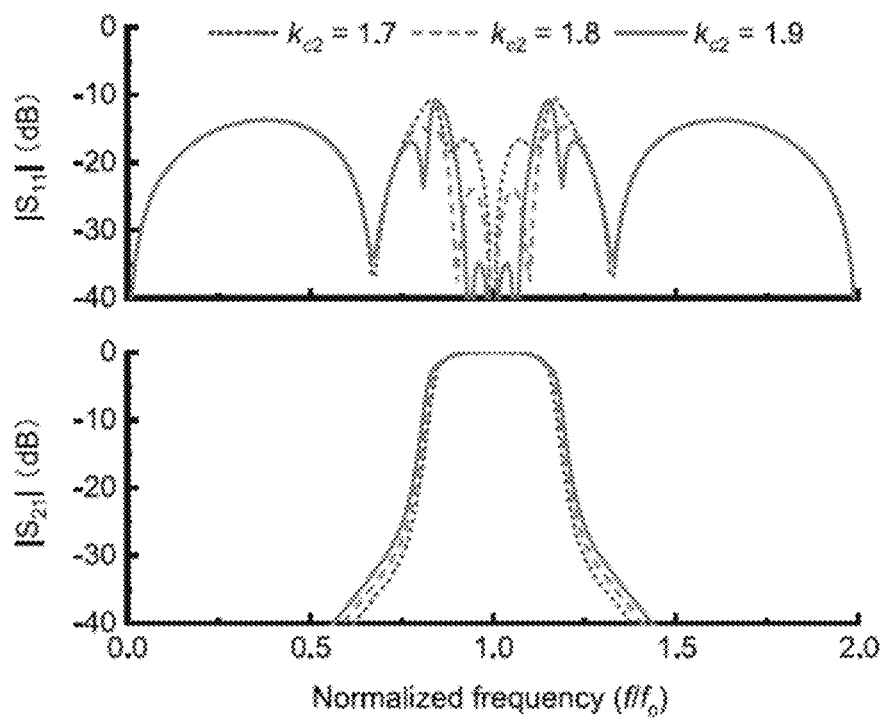
FIG. 14B illustrates a simulated frequency response for a 3-pole quasi-reflectionless bandpass filter with response to $k_{c2}$ in accordance with the disclosed embodiments.

FIGS. 14A and 14B show the respective frequency responses of the 2-pole and 3-pole quasi-reflectionless filters with respect to $k_{c2}$ when $Z_{c2}$ is set to 60. The transfer functions of both filters are almost unchanged as $k_{c2}$ varies, which again verifies that the bandwidth of this kind of absorptive filters is mainly determined by their absorptive stubs. Changing $k_{c2}$ also has almost no effect on the stopband reflection since the latter is directly related to the absorption. However, the reflection in the vicinity of the passband depends strongly on $k_{c2}$. A good compromise between passband reflection ($|S_{11}|<-25$ dB) and stopband reflection ($|S11|<-14$ dB) is achieved at $k_{c2}=1.8$ for both the 2-pole and the 3-pole quasi-reflectionless filters.

Figure 15:
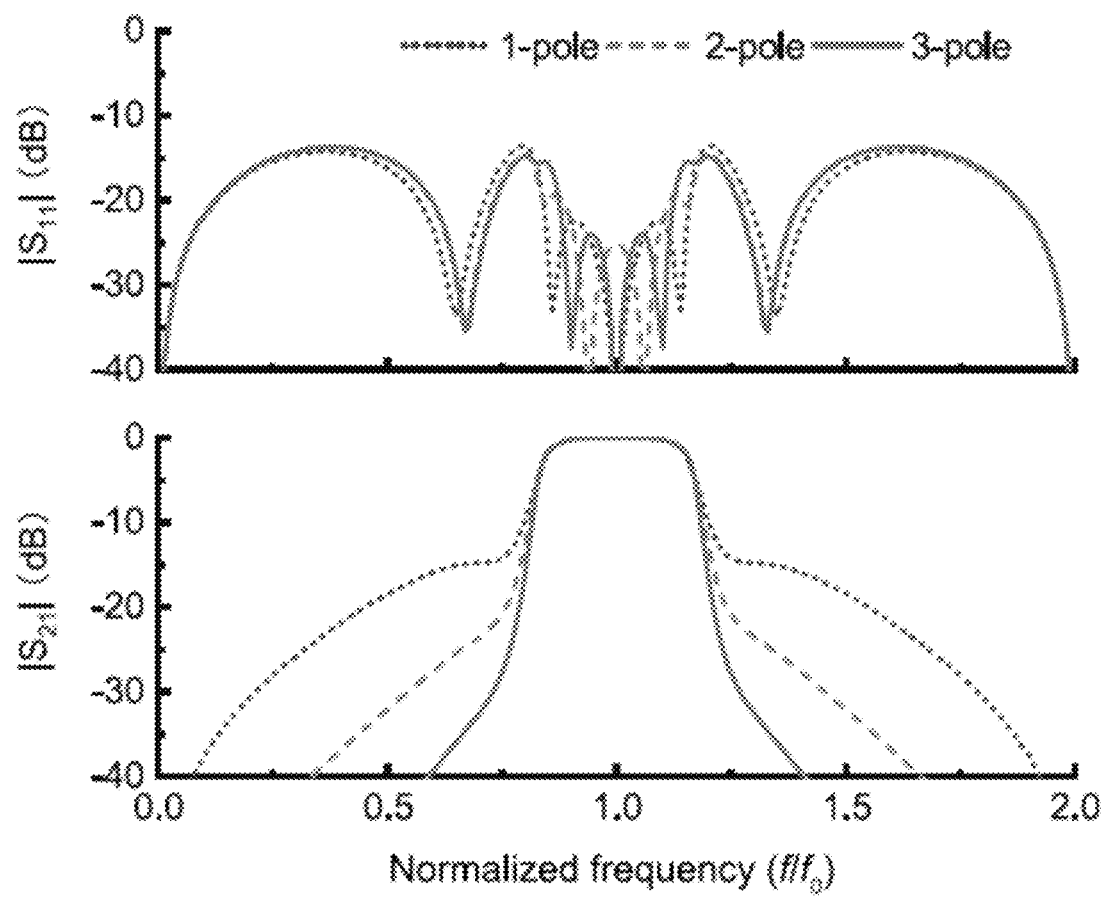
FIG. 15 illustrates a comparison of frequency responses between the 1-pole, 2-pole and 3-pole quasi-reflectionless bandpass filters in accordance with the disclosed embodiments.

FIG. 15 compares the simulated transmission and reflection coefficients of the 1-, 2-, and 3-pole quasi-reflectionless filters with the same absorptive stub. We can see that the passband bandwidth is almost identical for the three filters. Increasing the filter order only improves the far-out-of-band rejection. Consequently, the passband bandwidth and stopband attenuation specifications can be individually fulfilled in the design process.

Cross-Coupling for Improved Out-of-Band Rejection

The performance of the proposed quasi-reflectionless filters may be further improved by introducing cross-coupling between the absorptive stubs. Cross-coupling introduces additional signal paths between the input and output ports of a filter to create transmission zeros at certain frequencies. The transmission zeros result in sharper rejection without having to use additional resonators. As such, cross-coupling techniques are widely used in the design of conventional filters.

Source-load cross-coupling can be incorporated into the quasi-reflectionless bandpass filter scheme to generate two transmission zeros. Cross-coupling can also be implemented in the form of two-path signal-cancellation. In this case, cross-coupling can be introduced between the absorptive stubs to realize additional transmission zeros. To illustrate this, three examples are shown below.

Figure 16A:
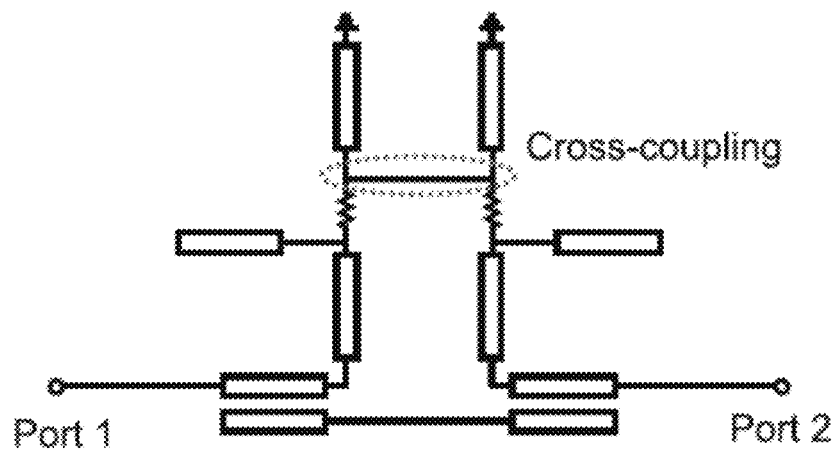
FIG. 16A illustrates an exemplary 1-pole quasi-reflectionless bandpass filter with cross-coupling in accordance with the disclosed embodiments.
Figure 16B:
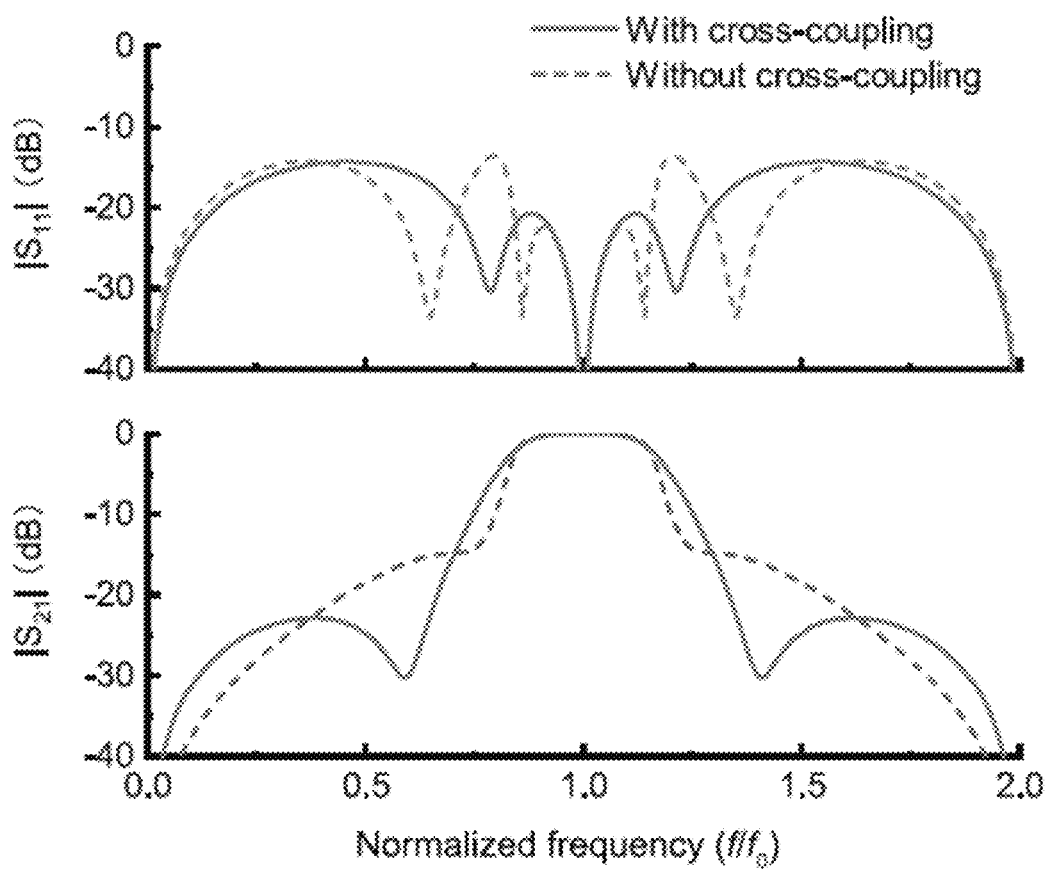
FIG. 16B illustrates a simulated frequency response for the 1-pole quasi-reflectionless bandpass filter with cross-coupling illustrated in FIG. 16A in accordance with the disclosed embodiments.

Cross-coupling is introduced into the proposed absorptive bandpass filters, which are already systematically studied in the "Absorptive Coupled-Lines" section above. FIG. 16A shows a cross-coupled 1-pole quasi-reflectionless filter similar to that of FIG. 6. Cross-coupling is introduced by connecting together the last quarter-wavelength resonator in each absorptive stub. This essentially merges the two quarter-wavelength stubs into one. As seen in FIG. 16B, two transmission zeros are generated at 0.6 GHz and 1.4 GHz, with a slight penalty in close-in rejection. Interestingly, the cross-coupling also helps to improve passband return loss.

Although the filter of FIG. 16A looks similar to the filter illustrated in FIG. 1A, they are in fact fundamentally different because they are designed based on the reflectionless feed line and even-odd duality, respectively. This difference is much more obvious for their high-order forms.

Figure 17A:
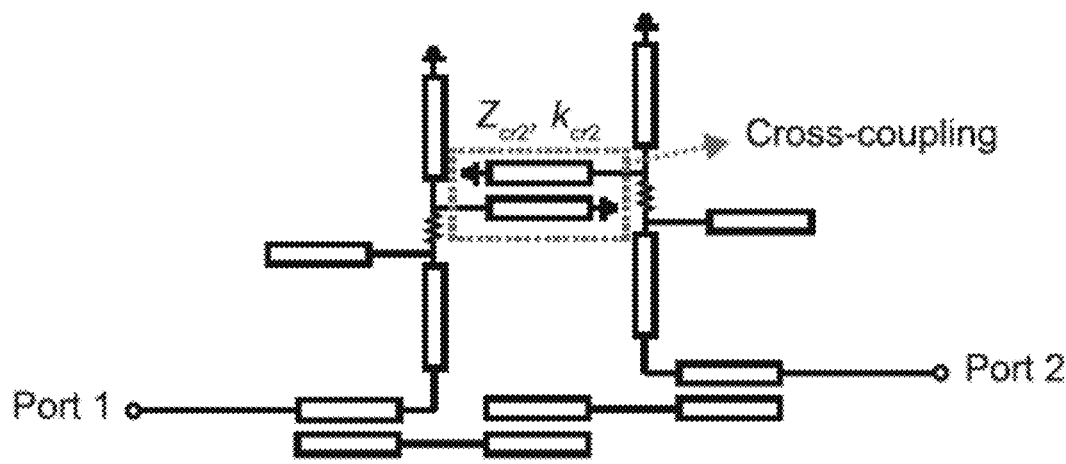
FIG. 17A illustrates an exemplary 2-pole quasi-reflectionless bandpass filter with cross-coupling in accordance with the disclosed embodiments.
Figure 17B:
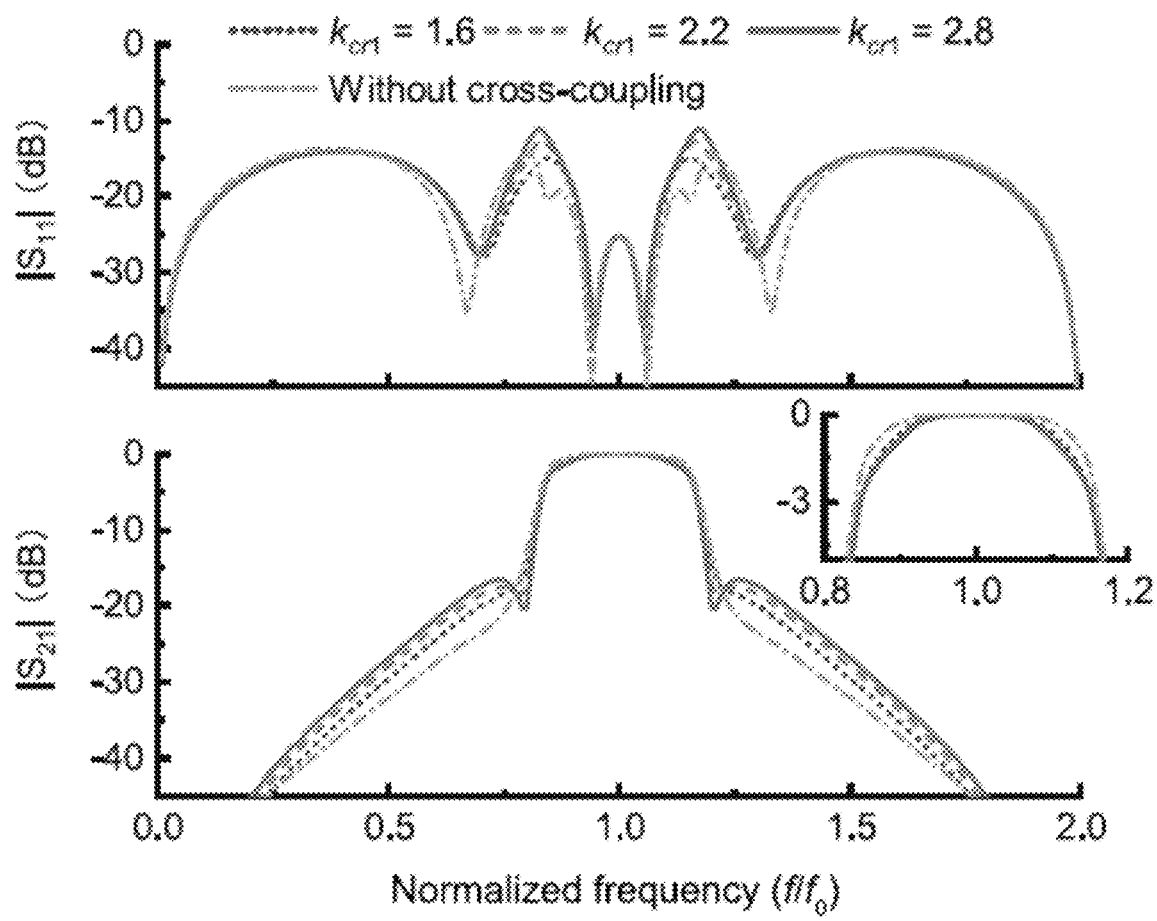
FIG. 17B illustrates a simulated frequency response for the 2-pole quasi-reflectionless bandpass filter with cross-coupling illustrated in FIG. 17A in accordance with the disclosed embodiments.

FIG. 17A shows a 2-pole cross-coupled quasi-reflectionless filter. In this case, cross-coupling is achieved through a short-ended coupled-lines section with coupled impedance $Z_{cr2}$ and coupling coefficient $k_{cr2}$. FIG. 17B shows a parametric study of the frequency response of this filter with respect to $k_{cr2}$ when $Z_{cr2}$ is 70Ω. As $k_{cr2}$ increases from 1.6 to 2.8, the two transmission zeros at 0.8 GHz and 1.2 GHz move closer to the imaginary axis but the return loss at the transition band (e.g., 0.83 GHz and 1.17 GHz) deteriorates with an increased transmission insertion loss.

Figure 18A:
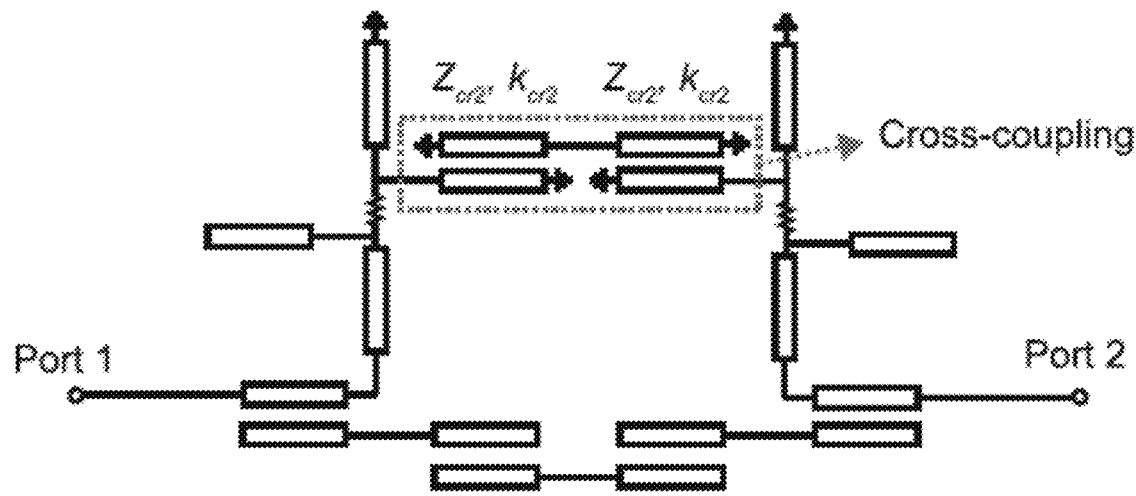
FIG. 18A illustrates an exemplary 3-pole quasi-reflectionless bandpass filter with cross-coupling in accordance with the disclosed embodiments.
Figure 18B:
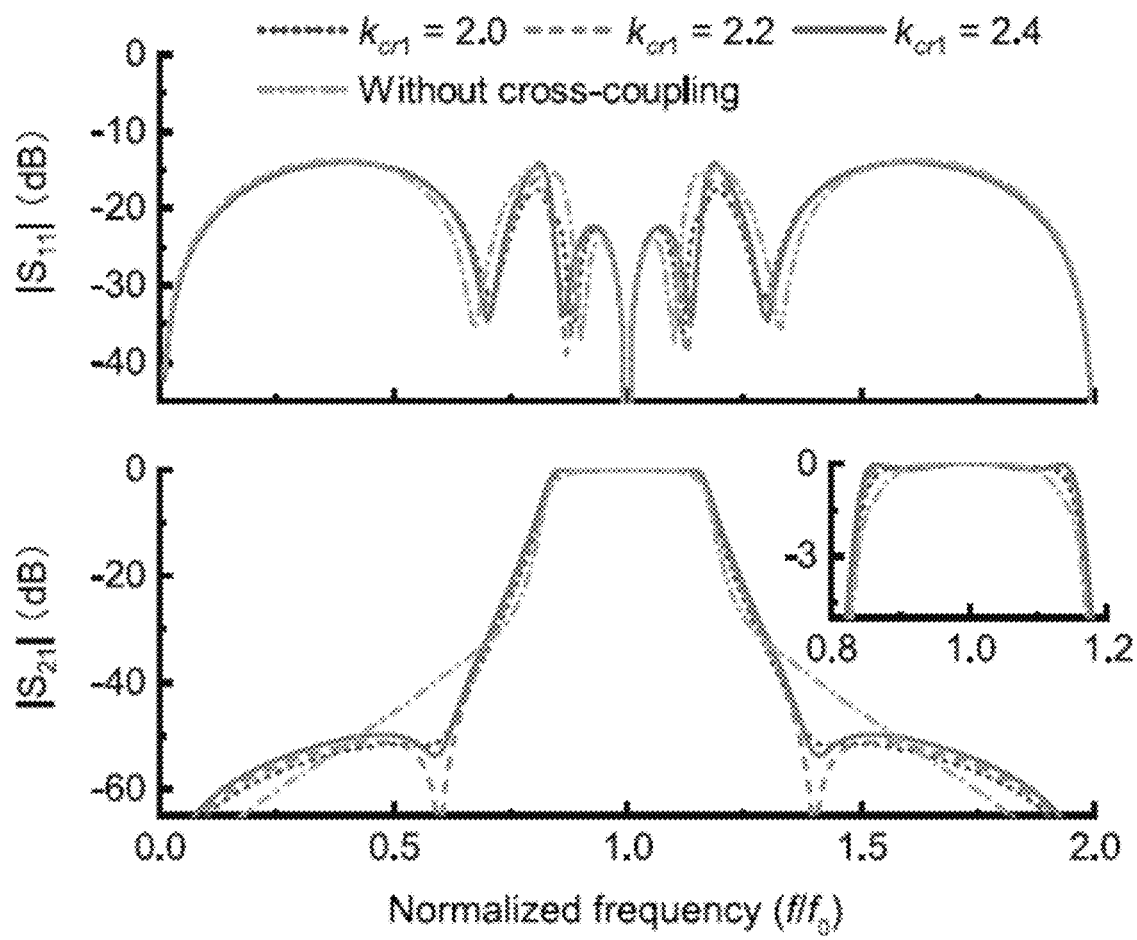
FIG. 18B illustrates a simulated frequency response for the 3-pole quasi-reflectionless bandpass filter with cross-coupling illustrated in FIG. 18A in accordance with the disclosed embodiments.

Following a similar method as the above, cross-coupling can be introduced in a 3-pole quasi-reflectionless filter as shown in FIG. 18A. Two short-circuit quarter-wavelength coupled-lines connect the last quarter-wavelength resonators in each absorptive stub. Two transmission zeros at 0.6 GHz and 1.4 GHz can be generated with almost unaltered filter reflection responses when the coupled coefficient $k_{cr2}$ is properly chosen. Unlike the 2-pole filter of FIG. 17B where the insertion loss is degraded by the cross-coupling, the 3-pole quasi-reflectionless bandpass filter with cross-coupling develops an equi-ripple passband with the help of additional transmission zeros created by the cross-coupling.

Design Procedures

According to the above studies, the design and optimization procedures of the proposed quasi-reflectionless bandpass filters can be summarized as follows.

(1) Specify the center frequency $f_0$, passband bandwidth $BW_{3dB}$, and stopband attenuation.

(2) The absorptive stub is synthesized from a low-pass prototype filter as in FIG. 3A. The ripple bandwidth $BW_r$ and hence the cut-off frequency $f_1$ of the prototype filter can be calculated from $BW_{3\ dB}$. Initial parameters of the absorptive stub circuit ($Z_a$, $Z_b$, $Z_c$) are then determined by (1), (9), (10), and (11). For simplicity, the resistor R can be set to be the same with the termination reference impedance $Z_0$.

(3) A 1-pole quasi-reflectionless bandpass circuit is first constructed using back-to-back connection of two absorptive coupled-lines (see FIG. 6). $Z_{c1}$ and $k_{c1}$ of the absorptive coupled-lines are used to cover the required transmission bandwidth. The values of the impedance scaling parameters $r_a$, $r_b$, and $r_c$ can be found by parametric analysis to realize a good compromise between a flat passband and good overall return loss.

(4) To meet the stopband attenuation specification, the order of the filter can be increased by simply cascading coupled-line sections ($Z_{c2}$ and $k_{c2}$) to the above 1-pole absorptive filter without significantly changing the passband transmission and reflection.

(5) Stopband attenuation can be further improved by introducing cross-coupling as in FIGS. 16A, 17A and 18A. For a given attenuation requirement, the choice between increasing the order and using cross-coupling should be carefully weighed.

Operating an Absorptive Coupled-Line Bandpass Filter

Figure 19:
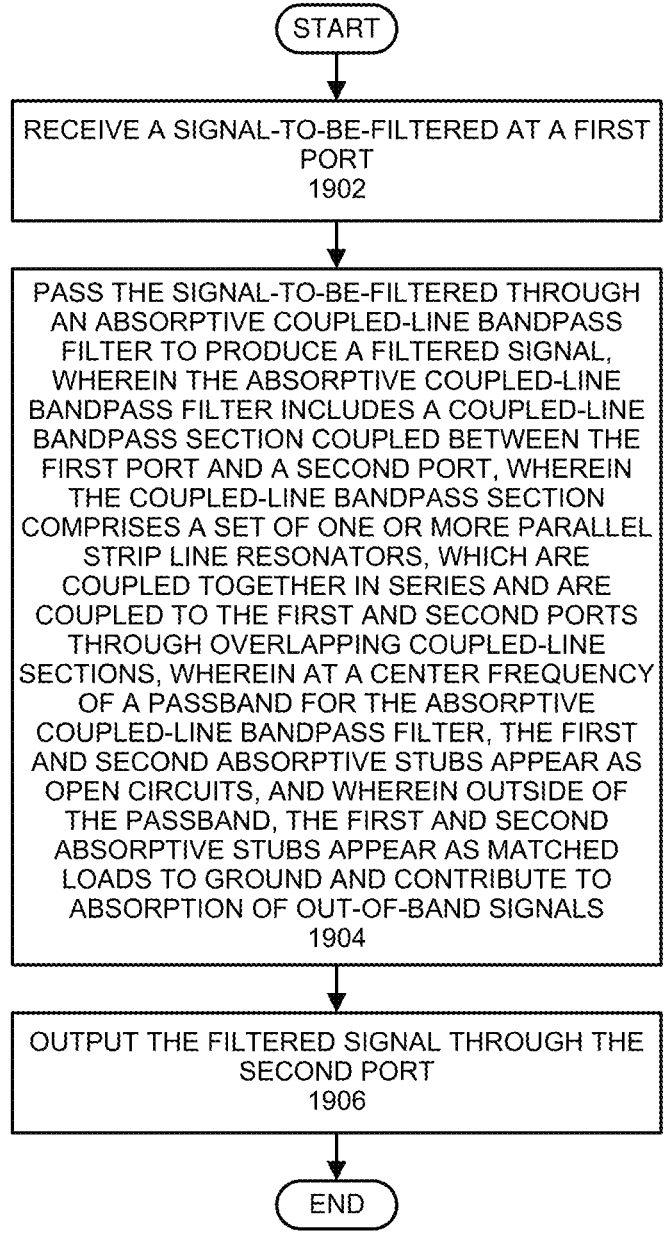
FIG. 19 presents a flow chart illustrating a process for operating an absorptive coupled-line bandpass filter system in accordance with the disclosed embodiments.

FIG. 19 presents a flow chart illustrating a process for operating an absorptive coupled-line bandpass filter system. During operation, the system receives a signal-to-be-filtered at a first port (step 1902). Next, the system passes the signal-to-be-filtered through an absorptive coupled-line bandpass filter to produce a filtered signal, wherein the absorptive coupled-line bandpass filter includes a coupled-line bandpass section coupled between the first port and a second port, wherein the coupled-line bandpass section comprises a set of one or more parallel strip line resonators, which are coupled together in series and are coupled to the first and second ports through overlapping coupled-line sections, wherein at a center frequency of a passband for the absorptive coupled-line bandpass filter, the first and second absorptive stubs appear as open circuits, and wherein outside of the passband, the first and second absorptive stubs appear as matched loads to ground and contribute to absorption of out-of-band signals (step 1904). Finally, the system outputs the filtered signal through the second port (step 1906).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An absorptive coupled-line bandpass filter, comprising;
a first port;
a second port;
a coupled-line bandpass section coupled between the first and second ports, wherein the coupled-line bandpass section comprises a set of one or more parallel strip line resonators that are coupled together in series and are coupled to the first and second ports through overlapping coupled-line sections, wherein:
the first port is coupled to a first end of the coupled-line bandpass section; and
the second port is coupled to a second end of the coupled-line bandpass section;
a first absorptive stub coupled to the first port; and
a second absorptive stub coupled to the second port.

2. The bandpass filter of claim 1, wherein:
at a center frequency of a passband for the absorptive coupled-line bandpass filter, the first and second absorptive stubs appear as open circuits; and
outside of the passband, the first and second absorptive stubs appear as matched loads to ground and contribute to absorption of out-of-band signals.

3. The bandpass filter of claim 1, wherein the coupled-line bandpass section includes one strip line resonator so that the bandpass filter forms a 1-pole quasi-reflectionless filter.

4. The bandpass filter of claim 1, wherein the coupled-line bandpass section includes two parallel strip line resonators so that the bandpass filter forms a 2-pole quasi-reflectionless filter.

5. The bandpass filter of claim 1, wherein the coupled-line bandpass section includes three parallel strip line resonators so that the bandpass filter forms a 3-pole quasi-reflectionless filter.

6. The bandpass filter of claim 1, wherein the coupled-line bandpass section includes N parallel strip line resonators so that the bandpass filter forms an N-pole quasi-reflectionless filter.

7. The bandpass filter of claim 1, wherein the first and second absorptive stubs each comprise a stub input, a resistor R and a quarter-wavelength resonator $Z_s$, wherein R and $Z_s$ are coupled in series between the stub input and ground.

8. The bandpass filter of claim 1, wherein the first and second absorptive stubs each comprise a stub input, three quarter-wavelength resonators $Z_a$, $Z_b$ and $Z_c$ and a resistor R, wherein $Z_c$, R and $Z_a$ are coupled in series between the stub input and ground, and wherein $Z_b$ is coupled to the connection between $Z_c$ and R.

9. The bandpass filter of claim 8, further comprising a cross-coupling connection between the first and second absorptive stubs to facilitate phase cancellation of signals at frequencies outside of the passband.

10. The bandpass filter of claim 9, wherein the cross-coupling connection connects together the last quarter-wavelength resonators $Z_c$ of the first and second absorptive stubs.

11. The bandpass filter of claim 9, wherein the cross-coupling connection comprises one or more cascaded coupled line sections, which are shorted to ground.

12. A communication system that includes an absorptive coupled-line bandpass filter, comprising:
a transmitter;
a receiver;
the absorptive coupled-line bandpass filter, which is located in the transmitter and/or receiver, wherein the absorptive coupled-line bandpass filter comprises:
a first port,
a second port,
a coupled-line bandpass section coupled between the first and second ports, wherein the coupled-line bandpass section comprises a set of one or more parallel strip line resonators that are coupled together in series and are coupled to the first and second ports through overlapping coupled-line sections, wherein:
the first port is coupled to a first end of the coupled-line bandpass section, and
the second port is coupled to a second end of the coupled-line bandpass section,
a first absorptive stub coupled to the first port, and
a second absorptive stub coupled to the second port.

13. The system of claim 12, wherein:
at a center frequency of a passband for the absorptive coupled-line bandpass filter, the first and second absorptive stubs appear as open circuits; and
outside of the passband, the first and second absorptive stubs appear as matched loads to ground and contribute to absorption of out-of-band signals.

14. The system of claim 12, wherein the coupled-line bandpass section includes one strip line resonator so that the bandpass filter forms a 1-pole quasi-reflectionless filter.

15. The bandpass filter of claim 12, wherein the coupled-line bandpass section includes two parallel strip line resonators so that the bandpass filter forms a 2-pole quasi-reflectionless filter.

16. The system of claim 12, wherein the coupled-line bandpass section includes three parallel strip line resonators so that the bandpass filter forms a 3-pole quasi-reflectionless filter.

17. The system of claim 12, wherein the coupled-line bandpass section includes N parallel strip line resonators so that the bandpass filter forms an N-pole quasi-reflectionless filter.

18. The system of claim 12, wherein the first and second absorptive stubs each comprise a stub input, a resistor R and a quarter-wavelength resonator $Z_s$, wherein R and $Z_s$ are coupled in series between the stub input and ground.

19. The system of claim 12, wherein the first and second absorptive stubs each comprise a stub input, three quarter-wavelength resonators $Z_a$, $Z_b$ and $Z_c$ and a resistor R, wherein $Z_c$, R and $Z_a$ are coupled in series between the stub input and ground, and wherein $Z_b$ is coupled to the connection between $Z_c$ and R.

20. The system of claim 19, further comprising a cross-coupling connection between the first and second absorptive stubs to facilitate phase cancellation of signals at frequencies outside of the passband.

21. The system of claim 20, wherein the cross-coupling connection connects together the last quarter-wavelength resonators $Z_c$ of the first and second absorptive stubs.

22. The system of claim 20, wherein the cross-coupling connection comprises one or more cascaded coupled line sections, which are shorted to ground.

23. A method for operating an absorptive coupled-line bandpass filter, the method comprising:
receiving a signal-to-be-filtered at a first port;
feeding the signal-to-be-filtered through an absorptive coupled-line bandpass filter to produce a filtered signal, wherein the absorptive coupled-line bandpass filter includes:
the first port;
a second port;
a first absorptive stub coupled to the first port;
a second absorptive stub coupled to the second port; and
a coupled-line bandpass section coupled between the first port and the second port, wherein the coupled-line bandpass section comprises a set of one or more parallel strip line resonators that are coupled together in series and are coupled to the first and second ports through overlapping coupled-line sections;
wherein at a center frequency of a passband for the absorptive coupled-line bandpass filter, the first and second absorptive stubs appear as open circuits, and wherein outside of the passband, the first and second absorptive stubs appear as matched loads to ground and contribute to absorption of out-of-band signals; and
outputting the filtered signal through the second port.

* * * * *